Dec. 23, 1958 W. T. DICKENS ET AL 2,865,617
PHENOL DECOMPOSING APPARATUS
Filed April 23, 1956
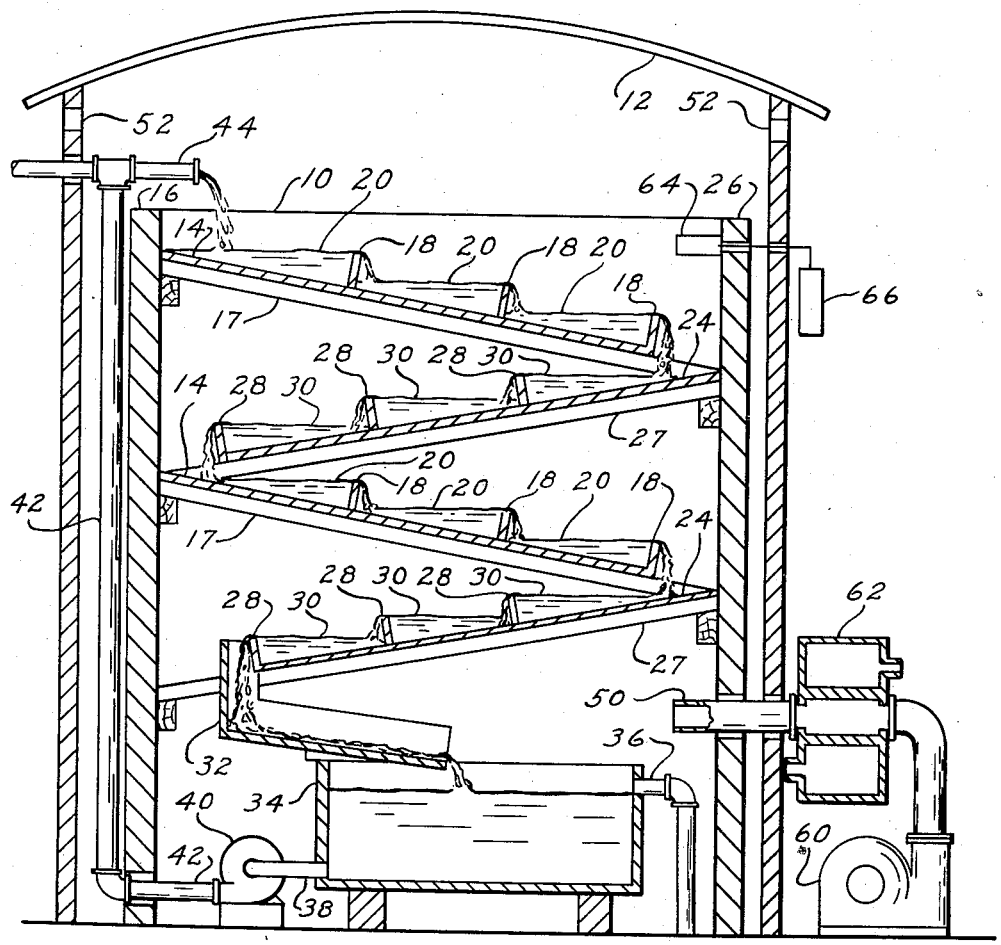
WILLIAM T. DICKENS
ALLEN D. EVANS   INVENTORS.
BY
ATTORNEY.

United States Patent Office 2,865,617
Patented Dec. 23, 1958

2,865,617

PHENOL DECOMPOSING APPARATUS

William T. Dickens, Cincinnati, and Allen D. Evans, Cleves, Ohio, assignors to Monsanto Chemical Company, St. Louis, Mo., a corporation of Delaware Application April 23, 1956, Serial No. 579,800

1 Claim. (Cl. 261—9)

The present invention relates to an apparatus adapted to destroy the phenolic components of aqueous solutions by biological oxidation.

The disposal of aqueous phenolic wastes constitutes a serious industrial problem, particularly in that the concentration of phenolic components contained in effluent waters discharged into rivers and streams must in many cases be reduced to the order of a few parts per million. It is known that phenolic compounds can be destroyed by biological oxidation in the presence of certain strains of aerobic bacteria, but the methods and apparatuses available for carrying out such reactions are not readily adaptable to the handling of industrial phenolic wastes. Such oxidations can be carried out by passing the aqueous phenolic wastes through rock-filled, tricklebed filters, but for a number of reasons, including their massive size, tricklebed filters are not an attractive apparatus to be employed in industrial installations. Aqueous phenolic wastes also can be oxidized in activated sludge beds, but the sensitivity of the activated sludge process to chemical and thermal shock renders its use hazardous in industrial installations.

It is an object of this invention to provide an improved apparatus for effecting the biological oxidation of aqueous phenolic wastes.

Another object of this invention is to provide an apparatus of this type that is inexpensive to construct and has a high efficiency.

Other objects and advantages of this invention will become apparent from the following detailed description thereof when read in conjunction with the attached drawing in which the single figure is a cross-sectional view of the embodiment of the invention.

In accordance with the present invention there is provided a new and highly efficient aqueous phenolic waste decomposing apparatus containing as its essential feature; a housing member provided with air vents in the side walls thereof, an open top vertical tower positioned within and occupying at least 50% of the interior volume of said housing member, a plurality of baffle plates positioned within said tower, said baffle plates containing a plurality of projections of substantially equal heighth from their upper surfaces which define a plurality of liquid reservoirs thereon, said baffle plates being attached alternately to opposing walls of said tower, said baffle plates being pitched downwardly 5–20° from a perpendicular drawn to said tower walls and overhanging the next lowermost baffle plate, means for introducing aqueous phenolic wastes onto at least the topmost baffle plate, liquid-collecting means positioned below the lowermost baffle plate, means for discharging at least a portion of the liquid from the liquid-collecting means, means for recycling at least a portion of the liquid from the liquid-collecting means through the tower, blowing means for introducing air into the tower at a point below the lowermost baffle plate, and means for controlling the temperature of the air introduced into the tower by the blowing means, said temperature-controlling means being cooperatively connected with and controlled by temperature-indicating means positioned within the tower.

In the embodiment of the apparatus illustrated in the single figure of the drawing a tower 10 is provided within a housing member 12. A series of baffle plates 14 are attached to vertical wall 16 of tower 10 and supported by arms 17. The baffle plates 14 are pitched slightly downwardly from wall 16, e. g., from 5° to 20° from a perpendicular drawn to wall 16. A series of projections 18 of substantially equal heighth are provided on each baffle plate 14 and impound liquid on the baffle plate in a series of liquid reservoirs 20. A corresponding series of baffle plates 24 are attached to vertical wall 26 of tower 10. The construction and support of baffle plates 24 is identical with that of baffle plates 14 and parts 27 and 28 of baffle plates 24 correspond to parts 17 and 18 of baffle plates 14. The projections 28 of baffle plates 24 define liquid reservoirs 30 corresponding to reservoirs 20 of baffle plates 14. The baffle plates 14 and 24 are alternately set upon opposing walls 16 and 26 and in overhanging relationship to the next lowermost baffle plate.

An inlet line 44 is provided in the apparatus for introducing aqueous phenolic wastes onto the topmost baffle plate 14. Below the lip 28 of the lowermost baffle plate 24 is provided a downwardly sloping trough 32 which empties into a collecting tank 34. An overflow line 36 is provided in collecting tank 34 and leads to either a drain or a further treating station. An outlet line 38 is provided in collecting tank 34 and is connected with a pump 40 and line 42 for recycling partially dephenolized aqueous wastes to inlet line 44.

An inlet pipe 50 is provided for introducing air into the apparatus and is connected to blower 60. The air supplied to pipe 50 by blower 60 passes through heat exchanger 62 and may be heated or cooled as desired. A suitable temperature indicating means 64, e. g., a thermocouple, positioned within tower 10 is connected to a temperature controlling means 66 which in turn is cooperatively connected to heat exchanger 62 by means not shown so as to control the temperature of air introduced to the apparatus through pipe 50. Outlet ports for 52 are provided in housing 12 to vent the apparatus.

In starting up the operation of the apparatus illustrated in the single figure of the drawing, an aqueous solution containing phenolic wastes, diluted to a concentration that is susceptible to biological oxidation in the presence of aerobic bacteria, e. g., 5–200 parts per million, is fed through line 44 onto the topmost baffle plate 14. The feed of aqueous phenolic wastes is continued until the apparatus is filled to capacity and the liquid level in tank 34 has risen to overflow line 36. At this time the introduction of aqueous phenolic wastes is stopped and recycling of the aqueous wastes through lines 38, 42 and 44 is started.

Decomposition of the phenolic wastes is started by inoculating the aqueous wastes with a suitable strain of aerobic bacteria. At the same time air is introduced into the apparatus through inlet pipe 50 and thoroughly aerates the aqueous wastes which flow downwardly through the apparatus in a tortuous cascade path. The air which is introduced is maintained at a predetermined temperature which favors the growth of the particular strain of aerobic bacteria introduced into the aqueous wastes. The phenolic content of the circulating liquid is followed by analysis and, when the phenolic concentration has fallen to a predetermined level, fresh feed of aqueous phenolic wastes is introduced into the apparatus through line 44. At this time dephenolized liquid is withdrawn from the apparatus through line 36. Thereafter, the process is operated continuously, with the ratio of fresh aqueous phenolic wastes and recycle liquor from tank 34 being fed into the apparatus through line 44 being continuously adjusted so that the phenolic content of the liquid in collecting tank 34 is maintained at a predetermined low level.

Many other modifications and variations of the apparatus herein described will be obvious to those skilled in the art and can be made without departing from the spirit and scope of the invention herein disclosed.

What is claimed is:

In a phenol decomposing apparatus of the class described, a housing member provided with air vents in the sidewalls thereof, an open top vertical tower positioned within and occupying at least 50% of the interior volume of said housing member, a plurality of baffle plates positioned within said tower, said baffle plates containing a plurality of projections of substantially equal height from their upper surfaces which define a plurality of liquid reservoirs thereon, said baffle plates being attached alternately to opposing walls of said tower, said baffle plates being pitched downwardly 5–20° from a perpendicular drawn to said tower walls and overhanging the next lowermost baffle plate, means for introducing aqueous phenolic wastes onto at least the topmost baffle plate, liquid-collecting means positioned below the lowermost baffle plate, means for discharging at least a portion of the liquid from the liquid-collecting means, means for recycling at least a portion of the liquid from the liquid-collecting means through the tower, blowing means for introducing air into the tower at a point below the lowermost baffle plate, and means for controlling the temperature of the air introduced into the tower by the blowing means, said temperature-controlling means being cooperatively connected with and controlled by temperature-indicating means positioned within the tower.

References Cited in the file of this patent

UNITED STATES PATENTS

| | | |
|---|---|---|
| 959,350 | Johnson | May 24, 1910 |
| 960,223 | Guillaume | May 31, 1910 |
| 1,133,371 | Du Commun | Mar. 30, 1915 |
| 1,331,784 | Roberts | Feb. 24, 1920 |
| 2,014,431 | Foster | Sept. 17, 1935 |
| 2,296,930 | Ihler | Sept. 29, 1942 |
| 2,725,343 | Lambert | Nov. 29, 1955 |